Figure 1:
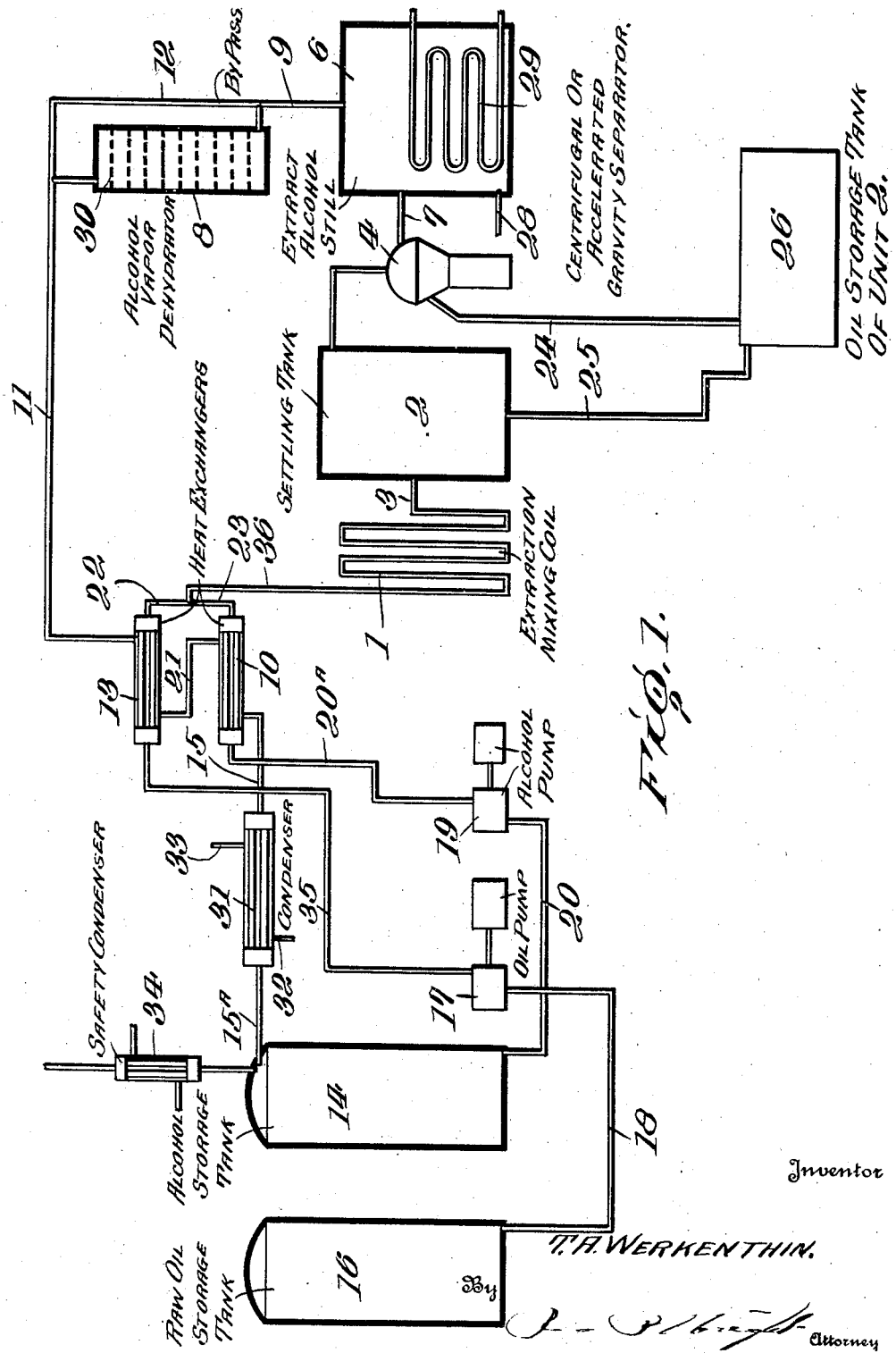

June 24, 1930.  T. A. WERKENTHIN  1,766,768
PROCESS OF AND APPARATUS FOR THE FRACTIONAL EXTRACTION
OF PETROLEUM HYDROCARBONS WITH ALCOHOL
Filed Dec. 30, 1927  2 Sheets-Sheet 1

Inventor
T. A. WERKENTHIN.
By
Attorney

June 24, 1930. T. A. WERKENTHIN 1,766,768
PROCESS OF AND APPARATUS FOR THE FRACTIONAL EXTRACTION
OF PETROLEUM HYDROCARBONS WITH ALCOHOL
Filed Dec. 30, 1927 2 Sheets-Sheet 2

Inventor
T. A. WERKENTHIN
By
Attorney

__Patented June 24, 1930__

__1,766,768__

UNITED STATES PATENT OFFICE

THEODORE A. WERKENTHIN, OF LIMA, OHIO, ASSIGNOR TO THE SOLAR REFINING COMPANY, OF LIMA, OHIO, A CORPORATION OF OHIO

PROCESS OF AND APPARATUS FOR THE FRACTIONAL EXTRACTION OF PETROLEUM HYDROCARBONS WITH ALCOHOL

Application filed December 30, 1927. Serial No. 243,643.

My invention relates to a process of and apparatus for the fractional extraction of petroleum hydrocarbons with alcohol.

In my copending application, Serial No. 750,783, filed Nov. 19, 1924, I have disclosed the treatment of petroleum hydrocarbons with alcohol whereby by fractional extraction there are obtained various desirable products including cracking stock and various grades of lubricating oils. In the process there set forth, the oil is introduced into an extraction tank where it is treated with alcohol. The reaction product is then passed into a settling tank to allow any undissolved oil which may have been carried along mechanically to settle out. The oil extract is thereafter passed into a still where under heat treatment the extraction product separates into two components, alcohol and oil. The alcohol is passed into a condenser, dehydrated and reused. The original stock from which an initial extraction product has been obtained is thereafter repeatedly subjected to the same treatment to produce a series of products.

Instead of carrying out the extraction process in an extraction tank, I propose to preheat both the alcohol and raw oil and allow the oil and alcohol to react in a mixing coil whereby the reaction of the components being treated is most efficiently and economically effected.

As a further improvement over my prior invention, a positively actuated system is employed instead of a gravity flow. Instead of relying upon a gravity feed, the oil and alcohol are pumped through the system.

In my prior process the separation of the undissolved oil and the alochol extraction product was carried out in a gravity separator. I now propose to employ in addition, a mechanical separator, preferably a centrifugal separator. Because of the character of the products being separated, namely, an oil, and an oil extraction product, considerable difficulty was encountered in effecting a separation, and separating in a settling tank was quite unsatisfactory. Ordinarily, in the separation of two components, gravity settling or separation can be exclusively relied upon but this is not true in the separation of products formed by the reaction of a heavy oil and alcohol.

I find that it is advantageous to position the main alcohol condenser between the alcohol storage tank and the alcohol superheater and provide the alcohol storage tank with an auxiliary condenser, preferably of the reflux type.

In some cases, it is necessary to dehydrate the alcohol, and this is accomplished in a dehydrator chamber. Frequently, however, it is not necessary to employ the dehydrator and therefore, in my present invention, I provide for cutting the dehydrator in or out of operation with the extract-alcohol still.

Means are also provided for maintaining the dehydrator chamber at a uniform temperature to prevent condensation therein of the alcohol. Preferably, this uniform temperature is maintained thermostatically.

Specifically, my process comprises preheating the oil, preheating the alcohol, extracting the preheated oil with the preheated alcohol in a mixing coil at a temperature not exceeding the boiling point of the alcohol and preferably between 100° F. and the boiling point of the alcohol whereby there is insured a high degree of solubility of the oil in the alcohol. The alcohol extraction product and the undissolved oil are separated in a centrifugal separator. The oil which is not acted upon by the alcohol is sucecssively extracted with alcohol to produce a series of products including lubricating oils and a residual oil.

My invention further consists in the features of construction, the combination of elements, and arrangement of parts which will be exemplified in the construction hereinafter set forth and the scope of the application thereof will be indicated in the following claims. However, it is to be understood that my invention is not limited to the precise construction and arrangement of parts, or the specific details of operation herein set forth.

My process of fractional extraction with alcohol is particularly applicable to:

1. Topped crude oil which I define as asphalt or paraffin base or mixed asphalt-paraffin base crude oil which is partially or totally deprived either by natural or artificial means, of any one or all of the following fractions: natural gasoline, kerosene, gas oil, cracking stock, fuel oil, and heavy distillate. Besides topped crude oil as defined above, I may use the following oils for fractional extraction with alcohol, 2. Wax bearing distillate,
3. Wax bearing residual oils,
4. Heavy hydrocarbon residual fuel oils which have not been vaporized or distilled,
5. Spent or used internal combustion engine lubricating oil, and
6. Heavy residual oils resulting from either pyrolytic disruption or polymerization of petroleum hydrocarbons or both.

In carrying out my invention any of the above-mentioned oils may be utilized as the starting material from which any or all of the following may be selectively extracted therefrom with alcohol: Cracking stock, waxes, different grades of lubricating oils and residual oils. Any one of the above oils may be extracted with alcohol so as to first dissolve the most soluble components which generally constitute the cracking stock. Thereafter, the remaining oil which has been deprived of the cracking stock is repeatedly subjected to an alcohol-extraction treatment to produce a series of lubricating oils of remarkably high character; waxes notable for their good crystallizing qualities; and a residuum or asphaltic substance. This residual oil furnishes an ideal binder material free from grit and impurities.

The entire process is carried out at a relatively very low temperature the specific temperature employed being determined somewhat by the character of the material undergoing treatment. It is desirable to maintain such a temperature as will insure a high degree of solubility of the oil in the alcohol. In practice, it has been found that the temperature range mentioned gives satisfactory results. However, the lower temperature employed will vary somewhat depending on the character of the oil. Therefore, while in the preferred form of my invention, the temperatures set forth are employed, it is desired to indicate that broadly, I do not wish to be strictly held within these limits. Some variation therefrom may be allowed, and the same will still come within the spirit of my invention.

The alcohol may be mixed with the oil to be extracted either in liquid form or in the vapor form. The oil to be extracted may be introduced in either the liquid, solid, or vapor form, although the liquid form of the oil is the most convenient and desirable one to use.

Figure 2:
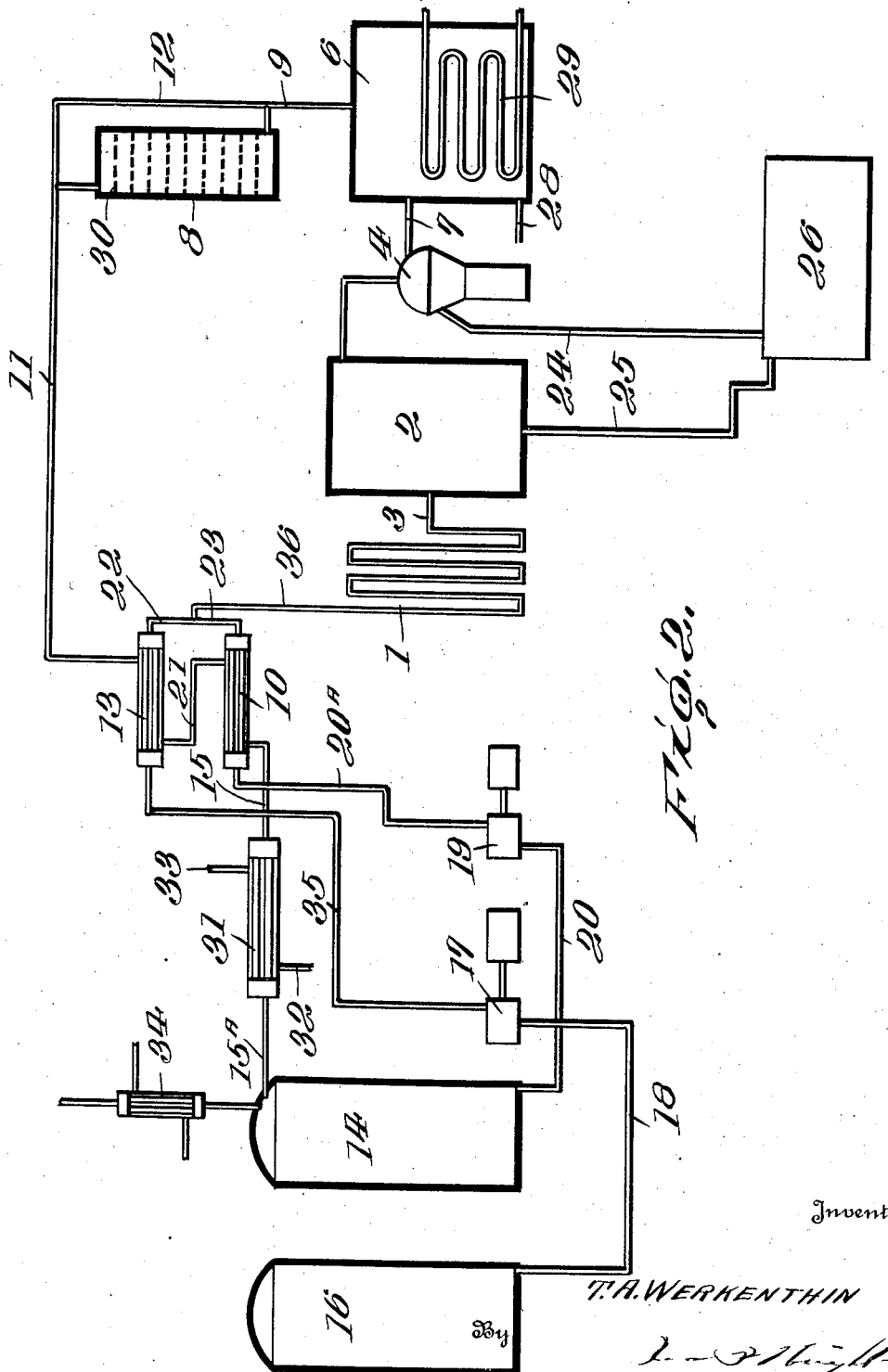

Apparatus suitable for carrying out my invention is illustrated in the accompanying drawings in which Figures 1 and 2 are elevations of successive extraction units.

The apparatus set forth in Figure 1, which for convenience will be referred to as unit 1, will be described in detail. Figure 2 shows a successive extraction unit similar to extraction unit 1 and will be referred to as unit 2. Units 3 and 4 substantially identical with unit 1 are usually employed. In view of their substantial identity, it is not necessary to have these latter units appear on the drawing. The size of the members in units 1, 2, 3 and 4 differ somewhat from those of unit 1 but otherwise there are no essential differences between the various units, and therefore, the description of Figure 1 will serve for the others.

Referring to Figure 1, unit 1 comprises an extraction-mixing coil 1, and a settling tank 2 connected by the conduit 3. The settling tank 2 is connected to a centrifugal separator 4 by the conduit 5. The extract-alcohol still 6 is connected to the separator 4 by means of a conduit 7 and with the alcohol vapor dehydrator 8 by conduit 9. The by-pass line 12 is connected to the conduits 9 and 11, leading into the extract-alcohol still 6 and the heat exchanger 13. The alcohol vapors coming from conduit 11 pass into heat exchanger 13 and then through conduit 21 into heat exchanger 10. From the latter the alcohol passes by means of a conduit 15 into the condenser 31. Conduit 15$^A$ connects the alcohol storage tank 14 with the condenser 31. The raw or basal oil storage tank 16 is connected by conduit 18 with the oil pump 17. Conduit 35 connects the oil pump 17 and the heat exchanger 13.

The alcohol storage tank 14 is connected to the alcohol pump 19 by means of conduit 20. Conduit 20$^A$ connects the alcohol pump with the heat exchanger 10. The oil heat exchanger 13 and the alcohol heat exchanger 10 are in operative connection with the extraction coil 1 by means of conduits 22, 23 and 36, respectively. The settling tank 2 and the accelerated gravity or centrifugal separator 4 are provided with conduits 25 and 24 respectively which allow removal of undissolved oil into oil storage tank 26 of unit 2. The heat necessary to carry out the process is furnished by the steam coil 29. Conduit 28 allows a collection of the portion of the extracted oil from the extract alcohol still 6. The alcohol vapor dehydrator chamber 8 is provided with means for holding a dehydrating material whereby the small traces of water which may have been extracted from the oil and distilled over with the alcohol, may be removed. This may comprise perforated plates carrying bags or canvas plates 30. The alcohol storage tank 14 is also provided with a safety condenser 34. The cooling water of condenser 31 is introduced through conduit 32 and the warm water leaves the condenser by conduit 33.

The process may be carried out as follows: Any of the oils previously mentioned may be introduced into the system. If a paraffin base oil or mixed paraffin-asphalt base oil is used, the extracted fraction of oil may be chilled in order to recover the wax or solid paraffin, but if an asphalt base oil is used, the latter may be directly introduced into the system without any subsequent treatment of the oils other than color treatment.

The raw or basal oil is pumped from storage tank 16 of unit 1 by means of the oil pump 17 through the heat exchanger 13, the oil being heated by the alcohol condensing vapors. After leaving the heat exchanger, the oil enters the mixing coil 1 and is there mixed with alcohol which has been heated by being passed through a similar heat exchanger 10. The amount of oil and alcohol mixed is metered by the pumps or by other suitable measuring devices, and the temperature of the oil and alcohol is approximately uniformly maintained. The alcohol will extract the light or more soluble portion of the oil. Generally speaking, the cracking stock will be extracted first. The dissolved oil extract and undissolved oil is run into a settling tank 2 where most of the undissolved oil settles out, the oil extract overflowing into the accelerated gravity or centrifugal separator 4 where the last traces of undissolved oil are removed. The extract is then forced into the extract-alcohol still 6 where the alcohol is distilled therefrom. The alcohol vapor passes first into the dehydrator 8 or through the by-pass line directly into the heat exchangers 10 and 13 which heat the alcohol and oil respectively. Under certain conditions it is usually desirable to have an auxiliary condenser or reflux condenser 34 in addition to the heat exchangers 10 and 13 and the water condenser 31. The distilled and condensed alcohol is collected in storage tank 14 and is again circulated through the system by the pump 19. The undissolved oil collected in the bottom of the settling tank 2 and the accelerated gravity or centrifugal separator 4, is run into the oil storage tank 26 which constitutes the oil to be circulated through the succeeding unit. The undissolved oil in storage tank 26 from which the "cracking stock" has been removed in unit 1 undergoes a similar process of extraction in the extraction mixing coil of unit 2 where the light lubricating oil components are extracted. The dissolved oil produced in the extractor mixing coil of unit 2 passes into a settling tank of unit 2 similar to that of unit 1 together with the undissolved oil. The extract and the remaining undissolved oil pass into an accelerated gravity of centrifugal separator where the remainder of the undissolved oil is separated from the extract. The alcohol is separated from the dissolved oil in the extract by distillation in the extract alcohol still of unit 2 which is similar to the extract-alcohol still of unit 1. The extracted oil which accumulates in the bottom of the extract-still of unit 2 is an oil having the general properties of light lubricating oil. The alcohol is condensed in the heat exchangers of unit 2 and is returned to the alcohol storage tank. The cycle of operation is continuously repeated. In units 3 and 4 there are extracted, in a similar manner as in units 1 and 2, the medium and heavy lubricating oil fractions. The undissolved oil from the last unit constitutes the residuum or asphalt referred to above. The amount and the extent of extraction is dependent upon and is proportional to the time of contact, area of oil exposed, the ratio of oil to alcohol, the type of oil being extracted and is also to some extent dependent on the temperature of extraction. Stated differently, the average oil extracted in unit 1 is made up of all the various constituents from the most soluble to those somewhat less soluble, such that the average composition is a fraction termed "cracking stock" because its properties resemble such.

The adaptibility and flexibility of the invention constitutes one of its main advantages because any desired series of extractions may be carried out resulting in the separation of the original oil, whichever one of those mentioned may have been selected, into such fractions as may be deemed desirable. The number of units may be increased or decreased depending on the extent of extraction desired and the number of different grades of oil to be obtained in the extraction process.

The properties, nature, and quantities of the different products obtained by the extraction process set forth are naturally dependent on the original molecular composition of the basal oil used in the extraction process but a typical example of the materials obtainable by the extraction process is the following: As a basal stock, a heavy fuel oil of gravity 17.5° Bé, flash at 200° F. is used. This stock is subjected to the extraction process as set forth. The more soluble components are dissolved first by the alcohol.

The oil extracted in unit 1 is a light oil amounting to only 10% of the amount of oil introduced into the system. It will have a gravity of 25.6° Bé., a viscosity of 75 to 80 seconds Saybolt at 100° F., a flash point of 200° F., a fire point of 230° F. and a cold test of 36° F. This stock is suitable for very light spindle oils but as it is usually constituted or composed of the oxygen and sulphur bearing compounds in the oil it is not desirable for lubricating oil stock. It is possible to use this oil without completely recovering the traces of alcohol after it is drawn off the extraction unit.

Light lubricating oil is produced in unit 2 to the extent of 15% of the basal oil introduced into the system. It has a viscosity of 150-200 seconds Saybolt at 100° F. and a gravity of about 25° Bé., a flash point of 340° F. and a fire point of 370° F.

This oil after color treatment is suitable for the lighter grades of lubricating oils. This wax content is well crystalizable and therefore its removal is easy, resulting in a low chill oil.

The third and most important product of the extraction process is an oil of 295-310 seconds Saybolt viscosity at 100° F. This is a high grade of lubricating oil and forms 25% of this particular oil charged into the system. It has a flash point of about 430° F. and a fire point of 480° F. It has a remarkable high gravity of 26° Bé.

This oil will also require a chilling or pressing as it contains wax but zero cold test can easily be obtained by one pressing. An example of the medium lubricating oil is as follows:

Gravity_____ 26.1° Bé.,
Flash_____ 430° F.,
Viscosity_____ 315° seconds at 100° F., and
Cold test (after pressing), 2° F.

The fourth product which results to the extent of 15% of the particular oil charged does not necessarily have to be separated but may be included in the product of the third unit if desired, thereby raising the viscosity of the medium lubricating oil. The viscous oil from unit 4 has a viscosity of from 500 to 650 seconds Saybolt, a gravity of about 25.7° Bé., a flash point of 493° F. and a fire point of 551° F. This high viscosity, high gravity oil requires the same treatment for finishing as does the oil produced in unit 3. An example of the heavy lubricating oil obtained is as follows:

Gravity____ 25.7° Bé.,
Flash_____ 490° F.,
Viscosity___ 596 seconds Saybolt at 100° F.

This lubricating oil has to be cold pressed and it is to be especially noted that all of these viscous oils are cold pressed in the presence of from 1 to 3 percent of alcohol, both to render them less viscous and to aid the wax crystal formation during chilling. It is, of course, obvious that this percentage of alcohol can be varied, depending upon circumstances, and the example given is by way of illustration and not limitation.

The extracted oils as they come from the extraction units are allowed to retain a small quantity of alcohol, varying approximately between ¼ and 3%. Due to the retained alcohol, the oils have a remarkably low viscosity and can be easily pumped and otherwise handled. However, one of the most important features possessed by all of the extracted oils produced by this process is their remarkable fine crystallizing qualities. All of the extracted oils which are derived from pariffin or mixed paraffin-asphalt basal oils, when chilled for wax extraction purposes show a crystallization of wax of good firm crystals. There is no formation of the so-called "amorphous wax" which is apparently nothing more than wax prevented from crystal-formation due to the presence of a disturbing colloidal substance. Whether the presence of the solvent in the process-extracted oils counteracts the influence of such a colloid, or whether the colloid is left behind in the residuum, or whether the action of the alcohol-extraction destroys this disturbing colloidal substance which interfers with crystallizing qualities is not known, but the facts are that the extracted oils show excellent crystallizing qualities throughout, making the wax-pressing operation especially easily carried out, and resulting in a separation of wax and oil which leaves both the wax and oil in a much purer state than has hitherto been achieved in the art of paraffin wax making due to, (1) the lessened viscosity of the oils and, (2) the excellent crystal formation during chilling of all the extracted oils which have been derived from any of the types of oils previously mentioned derived from paraffin or mixed asphalt-paraffin base oils. After the desired color has been obtained and the oil freed of its paraffin content, the remaining traces of alcohol may be removed to restore the viscosity as disclosed in application Serial No. 71,112, filed Jan. 21, 1926.

The residuum or asphalt comprises about 35% of the particular fuel oil charged into the system and is best converted to true asphalt by blowing to produce the desired consistency. At 100° F. this residuum-oil flows very slowly, has a shiny black appearance and is sticky to the touch. A remarkable feature of the asphalt is that only a small percent of free carbon is present unless found in such fine colloidal suspension that it does not show up when the mass is dissolved in benzine and filtered.

My process may be applied also to the extraction and separation of a heavy fuel oil derived from the bottom of a pipe still. An example thereof using five units follows. Starting with a basal or raw oil having a gravity at 60° F., of 19.1° Bé, a viscosity of 735 seconds at 130° F. and a pour test of 65° F., there results:

Basal or raw oil to be extracted:
    Gravity at 60° F____ 19.1
    Saybolt viscosity in seconds at 130° F____ 735
    Pour test 65° F.

Extracted oil derived in Unit 1
    Percent of raw oil extracted__ 24%
    Gravity at 60° F____ 20.8° Bé.
    Saybolt viscosity in seconds at 100° F____ 325
    Saybolt viscosity in seconds at 210° F____ 62

Extracted oil derived in Unit 2
    Percent of raw oil extracted__ 19%
    Gravity at 60° F____ 21.4° Bé.
    Saybolt viscosity in seconds at 100° F____ 500
    Saybolt viscosity in seconds at 210° F____ 69

Extracted oil derived in Unit 3
    Percent of raw oil extracted__ 6½%
    Gravity at 60° F____ 22.8° Bé.
    Saybolt viscosity in seconds at 100° F____ 690
    Saybolt viscosity in seconds at 210° F____ 80

Extracted oil derived in Unit 4
    Percent of raw oil extracted__ 23%
    Gravity at 60° F____ 22.6° Bé.
    Saybolt viscosity in seconds at 100° F____ 1200
    Saybolt viscosity in seconds at 210° F____ 101

Extracted oil derived in Unit 5
    Percent of raw oil extracted__ 10%
    Gravity at 60° F____ 21.9° Bé.
    Saybolt viscosity in seconds at 100° F____ 4700
    Saybolt viscosity in seconds at 210° F____ 181

Residuum after extraction
    Percent of raw oil____ 17½%

It will be seen that there has been produced:
1st. A medium lubricating oil of 325 seconds viscosity;
2nd. A somewhat heavier oil of 500 seconds viscosity;
3rd. A heavy oil of 690 seconds viscosity;
4th. An extra heavy viscous oil which has a viscosity of 1200 seconds, and
5th. A super-heavy oil of 4700 seconds viscosity.

Any of the standard methods for dehydrating alcohol may be employed to obtain an anhydrous product used in the process or the alcohol may be bought already anhydrous in the market. Only the initial amount required for the process is large, and the amount required later on is just that needed to replace the slight loss due to evaporation from the continuous closed system. In order to insure the anhydrous nature of the alcohol as it is kept circulating around in the continuous system described in this application, it is desirable to circulate portions of alcohol contained in the storage tank to a small still equipped with a vapor dehydrator. The alcohol when circulated through the system needs no purification unless dehydrating the traces of water that are carried along with the alcohol may be spoken of as purification. One of the advantages of the present process is that the alcohol needs no troublesome process of revivifying and can be used an indefinite length of time.

It is desired to indicate that the total yield of lubricating oils obtainable when using my process will be almost two and one-half times the usual quantity obtainable with the overhead distillation processes now in use. On the other hand, if it is not desired to produce such a large amount of lubricating oils my process nevertheless represents the most economical method of producing cracking stock for the pressure stills. The contention of superior quality oil produced by my process is based upon the following consideration: The light gravity oil produced contains a homogeneous series of hydrocarbons that, as shown by a series of carbonization tests and practical lubrication tests, will withstand high temperature better, and with a production of less carbon than the oils obtained by ordinary distillation.

Substances may have almost identical boiling points and differ in other essential properties. The state of affairs occurs without and in organic chemicals and also applies to components of crude petroleum. Thus, two substances may have identical vaporization temperatures yet may differ widely in the temperature at which decomposition occurs. The differential solubility of the components of petroleum oil in alcohol greatly eliminates this. The total value of all the products produced in the process as compared with the total value of the products ordinarily produced will show a good margin in favor of my process.

Another big factor of economy of the process is the construction of the various units. As there is substantially no pressure on them, they may be of light contruction effecting a great saving of material in the structural and foundation as well as in the boiler construction. The highest temperature experienced in the process will be the boiling point of the anhydrous alcohol which is never more than 212° F.

Furthermore, no fire of any kind is in contact or in the vicinity of the oil or alcohol during the operation of the process; thus giving a reduction in the fire hazard with a corresponding saving on the insurance rates. To a large extent the fuel consumption and power production may be centralized, and by the use of steam, the process may be made entirely automatic since the temperature control of the extractor units and the rate of flow of the oil through the system can be, and in practice are, automatically regulated.

Methyl, ethyl, propyl and iso-propyl alcohol or mixtures of these alcohols may be used as the extraction medium. These alcohols should be anhydrous or substantially so. For example, satisfactory results have been obtained by using anhydrous alcohol of 99.5% strength. Theoretically, it is possible to carry out the extraction process with alcohol of lower strength. However, when the principle of alcohol extraction is applied in large scale operation, it has been found that the use of a lower strength alcohol is not practical.

The residuum or remaining oil from the last extraction step will in general be of the nature of asphaltum, its precise qualities depending on whether asphalt base oil or paraffin base oil or mixed paraffin asphalt base oil was used in the process of extraction. The carbon content of the residuum asphaltum will be directly proportional to the carbon content of the basal oil extracted, that is, all the free carbon is apparently left behind in the residuum as no free carbon is extracted with alcohol. The method of alcohol extraction is therefore applicable to the separation of lubricating oil from solid or suspended free carbon or other impurities that the oil to be extracted may contain, that is, used lubricating oil may be reclaimed.

The temperature of the dehydrator 8 is maintained uniformly so as to prevent condensation of the alcohol. This is preferably accomplised by a thermostatic arrangement.

What I claim is:

1. The process of treating heavy petroleum oils comprising preheating oil, preheating alcohol, thereafter successively extracting preheated oil with preheated alcohol in a mixing coil at a tempearture not exceeding the boiling point of the alcohol whereby there is insured a high degree of solubility of the oil in the alcohol, and separating from each successive extraction product in a centrifugal separator the resulting alcohol extraction product and undissolved oil.

2. The process of treating heavy petroleum oils comprising preheating any one of the following groups of oils: Topped crude oil, wax bearing distillate, wax bearing residual oils, heavy hydrocarbon residual fuel oils which have not been vaporized or distilled, and spent or used internal combustion engine lubricating oil, thereafter successively extracting preheated oil with preheated alcohol in a mixing coil at a temperature not exceeding the boiling point of the alcohol whereby there is insured a high degree of solubility of the oil in the alcohol, and separating from each successive extraction product in a centrifugal separator the resulting alcohol extraction product and undissolved oil.

3. The process of treating heavy petroleum oils comprising preheating oil, preheating alcohol, mixing the preheated alcohol and preheating oil in an extraction-mixing coil, passing the resulting product into a settling tank to remove the undissolved oil, passing the extraction product into a centrifugal separator to complete the removal of undissolved oil, removing the alcohol from the alcohol-extraction product, recovering the dissolved oil, and passing the alcohol through an alcohol heat exchanger and an oil heat exchanger to preheat fresh portions of incoming alcohol and oil.

4. The process of treating heavy petroleum oils comprising preheating any one of the following group of oils: Topped crude oil, wax bearing distillate, wax bearing residual oils, heavy hydrocarbon residual fuel oils which have not been vaporized or distilled, and spent or used internal combustion engine lubricating oil, preheating alcohol, mixing the preheated alcohol and preheated oil in an extraction-mixing coil, passing the resulting product into a settling tank to remove the undissolved oil, passing the extraction product into a centrifugal separator to complete the removal of undissolved oil, removing the alcohol from the alcohol-extraction product, recovering the dissolved oil, and passing the alcohol through an alcohol heat exchanger and an oil heat exchanger to preheat fresh portions of incoming alcohol and oil.

5. In an apparatus for extracting hydrocarbons with alcohol, a mixing coil, means for passing an oil-alcohol mixture through said coil, a settling tank, means for passing the mixture from said coil through said settling tank to produce an alcohol extraction product and undissolved oil, a centrifugal separator, means for passing said mixture from said settling tank through said centrifugal separator to remove undissolved oil, an extract alcohol still, means for passing the mixture from said separating tank through said still for separating alcohol from the alcohol extract product containing dissolved hydrocarbons and means for passing the mixture from said still to means for recovering the separated alcohol and hydrocarbons.

6. In an apparatus for extracting hydrocarbons with alcohol, an alcohol storage vessel, an oil storage vessel, an alcohol heat exchanger, an oil heat exchanger, means for passing oil and alcohol from said tank through the respective heat exchangers, an extracting mixing coil, means for passing oil-alcohol mixture from said heat exchangers through said mixing coil to produce an alcohol extraction product and undissolved oil, a settling tank, means for passing an alcohol extraction product from said mixing coil to said settling tank, a centrifugal separator, means for passing the oil extract from said settling tank to said separator, an extract alcohol still, means for passing the extract from said separator through said still for thermally separating alcohol from the alcohol extraction product containing dissolved hydrocarbons, means for passing the heated alcohol from said still into said heat exchanger, means for recovering the separated alcohol and means for recovering the hydrocarbons.

7. In an apparatus for extracting hydrocarbons with alcohol, an alcohol storage vessel, an oil storage vessel, an alcohol heat exchanger, an oil heat exchanger, means for passing the oil and alcohol from the said tank through the respective heat exchangers, an extracting mixing coil, means for passing the oil-alcohol mixture from said heat exchangers through said mixing coil to produce an alcohol extraction product and undissolved oil, a settling tank, means for passing the alcohol extract product from said mixing coil to said settling tank, a centrifugal separator, means for passing the oil extract from said settling tank to said separator, an extract alcohol still, means for passing the extract from said separator through said still for thermally separating alcohol from the alcohol extraction product containing dissolved hydrocarbons, means for passing the heated alcohol from said still into said heat exchangers, a condenser for cooling the heated alcohol, means for returning the alcohol from said condenser to the alcohol storage tank and means for recovering the hydrocarbons.

8. In an apparatus for extracting hydrocarbons with alcohol, an alcohol storage vessel, an oil storage vessel, an alcohol heat exchanger, an oil heat exchanger, means for passing oil and alcohol from said storage vessels through the respective heat exchangers, an extraction mixing coil, means for passing oil-alcohol mixture from said heat exchangers through said mixing coil to produce an alcohol extraction product and undissolved oil, a settling tank, means for passing an alcohol extraction product from said mixing coil to said settling tank, a centrifugal separator, means for passing the oil extract from said settling tank to said separator, an extract alcohol still, means for passing the extract from said separator through said still for thermally separating alcohol from the alcohol extract product containing dissolved hydrocarbons, an alcohol dehydrator, means for passing the alcohol through said dehydrator from said still, means for passing the heated alcohol from said dehydrator to said heat exchangers, means for recovering the alcohol and means for recovering the hydrocarbons.

9. In an apparatus for extracting hydrocarbons with alcohol, an alcohol storage vessel, an oil storage vessel, an alcohol heat exchanger, an oil heat exchanger, means for passing oil and alcohol from said storage vessels through the respective heat exchangers, an extraction mixing coil, means for passing oil-alcohol mixture from said heat exchangers through said mixing coil to produce an alcohol extraction product and undissolved oil, a settling tank, means for passing an alcohol extraction product from said mixing coil to said settling tank, a centrifugal separator, means for passing oil extract from said settling tank to said separator, an extract alcohol still, means for passing the extract from said separator through said still for thermally separating alcohol from the alcohol extract product containing dissolved hydrocarbons, an alcohol dehydrator provided with a series of trays for holding a dehydrating agent, means for passing alcohol from said alcohol still through said dehydrator, means for passing the heated alcohol from said dehydrator through said heat exchangers, means for recovering the alcohol and means for recovering the hydrocarbons.

10. In an apparatus for extracting hydrocarbons with alcohol, an alcohol storage vessel, an oil storage vessel, an alcohol heat exchanger, an oil heat exchanger, means for passing oil and alcohol from said storage vessels through the respective heat exchangers, an extraction mixing coil, means for passing oil-alcohol mixture from said heat exchangers through said mixing coil to produce an alcohol extraction product and undissolved oil, a settling tank, means for passing an alcohol extraction product from said mixing coil to said settling tank, a centrifugal separator, means for passing the oil extract from said settling tank to said separator, an extract alcohol still, means for passing the extract from said separator through said still for thermally separating the alcohol from the alcohol extraction product containing dissolved hydrocarbons, an alcohol dehydrator, means for cutting said alcohol dehydrator in and out of connection with said extract alcohol still, means for passing the heated alcohol from either the alcohol still or from the dehydrator through said heat exchangers, means for recovering the alcohol and means for recovering the hydrocarbons.

11. In an apparatus for extracting hydrocarbons with alcohol, an alcohol storage vessel, an oil storage vessel, an alcohol heat exchanger, an oil heat exchanger, means for passing oil and alcohol from said storage vessels through the respective heat exchangers, an extraction mixing coil, means for passing oil-alcohol mixture from said heat exchangers through said mixing coil to produce an alcohol extraction product and undissolved oil, a settling tank, means for passing an alcohol extraction product from said mixing coil to said settling tank, a centrifugal separator, means for passing the oil extract from said settling tank to said separator, an extract alcohol still, means for passing the extract form said separator through said still for thermally separating the alcohol from the alcohol extract product containing dissolved hydrocarbons, an alcohol dehydrator provided with a series of trays for holding the dehydrating chemical, means for passing the alcohol from said still through said dehydrator or directly to said heat exchangers, means for recovering the alcohol and means for recovering the hydrocarbons.

12. In an apparatus for extracting hydrocarbons with alcohol, an alcohol storage vessel, an oil storage vessel, an alcohol heat exchanger, an oil heat exchanger, means for passing oil and alcohol from said tank through the respective heat exchangers, an extracting mixing coil, means for passing oil-alcohol mixture from said heat exchangers through said mixing coil to produce an alcohol extraction product and undissolved oil, a settling tank, means for passing alcohol extraction product from said mixing coil to said settling tank, a centrifugal separator, means for passing the oil extract from said settling tank to said separator, an extract alcohol still, means for passing the extract from said separator through said still for thermally separating alcohol from the alcohol extract product containing dissolved hydrocarbons, a condenser, means for passing heated alcohol from said still through said condenser for cooling the alcohol passing therethrough, means for recovering the alcohol and means for recovering the hydrocarbons.

13. In an apparatus for extracting hydrocarbons with alcohol, an extraction mixing coil through which is adapted to pass an oil-alcohol mixture, a centrifugal separator, means for passing an alcohol extraction product from said mixing coil through said centrifugal separator, an extract alcohol still, means for passing the extract from said separator through said still, a dehydrator, means for cutting said dehydrator in and out of connection with said still for dehydrating said alcohol product, means for recovering the alcohol and means for recovering the hydrocarbons.

14. In an apparatus for extracting hydrocarbons with alcohol, an alcohol storage tank, an oil storage tank, an alcohol heat exchanger, an oil heat exchanger, means for forcing alcohol from the alcohol storage tank through the alcohol heat exchanger, means for forcing oil from the oil storage tank through the oil heat exchanger, an extract mixing coil, means for passing a preheated oil-alcohol mixture from said heat exchangers through said mixing coil to produce an alcohol extract product and undissolved oil, a settling tank, means for passing an alcohol extract product from said mixing coil through said settling tank for separating undissolved oil from the alcohol extract product, a centrifugal separator, means for passing oil extract from said settling tank to said separator for further separating dissolved oil from the alcohol extract product, an extract alcohol still, means for passing the extract from said separator through said still for removing the alcohol from the alcohol extract product, a dehydrator, means for passing the alcohol from said still through said dehydrator, means for passing the resulting alcohol vapors from the dehydrator through the alcohol heat exchanger and the oil heat exchanger, means for returning alcohol from the heat exchangers to the alcohol storage tank, and means for recovering the hydrocarbons.

In testimony whereof I hereunto affix my signature.

THEODORE A. WERKENTHIN.